Dec. 31, 1963   H. S. IRWIN ETAL   3,116,048
UPROOTING ATTACHMENT FOR TRACTORS
Filed Nov. 6, 1961   3 Sheets-Sheet 1
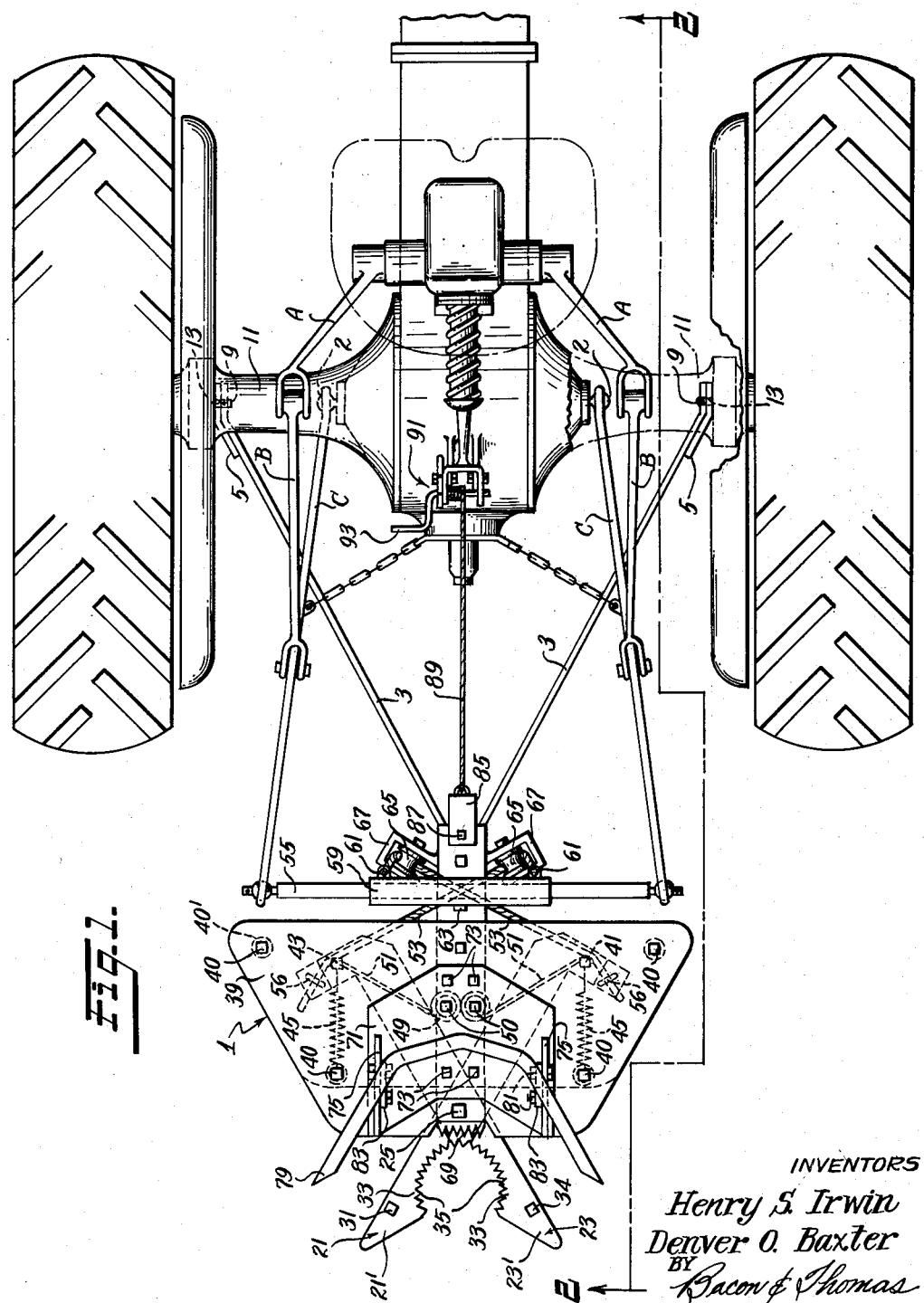
INVENTORS
Henry S. Irwin
Denver O. Baxter
BY
Bacon & Thomas
ATTORNEYS

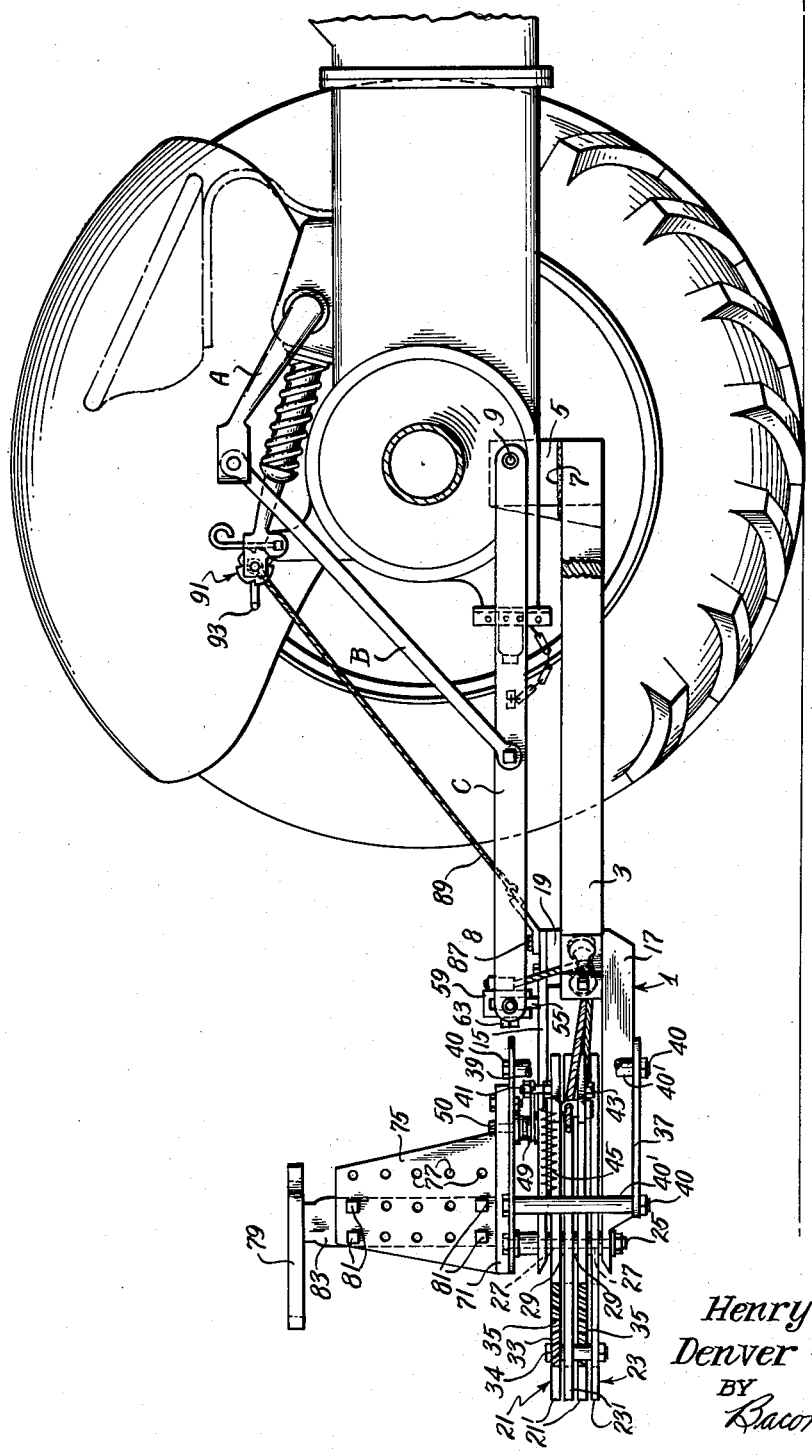

Dec. 31, 1963    H. S. IRWIN ETAL    3,116,048
UPROOTING ATTACHMENT FOR TRACTORS
Filed Nov. 6, 1961    3 Sheets-Sheet 3
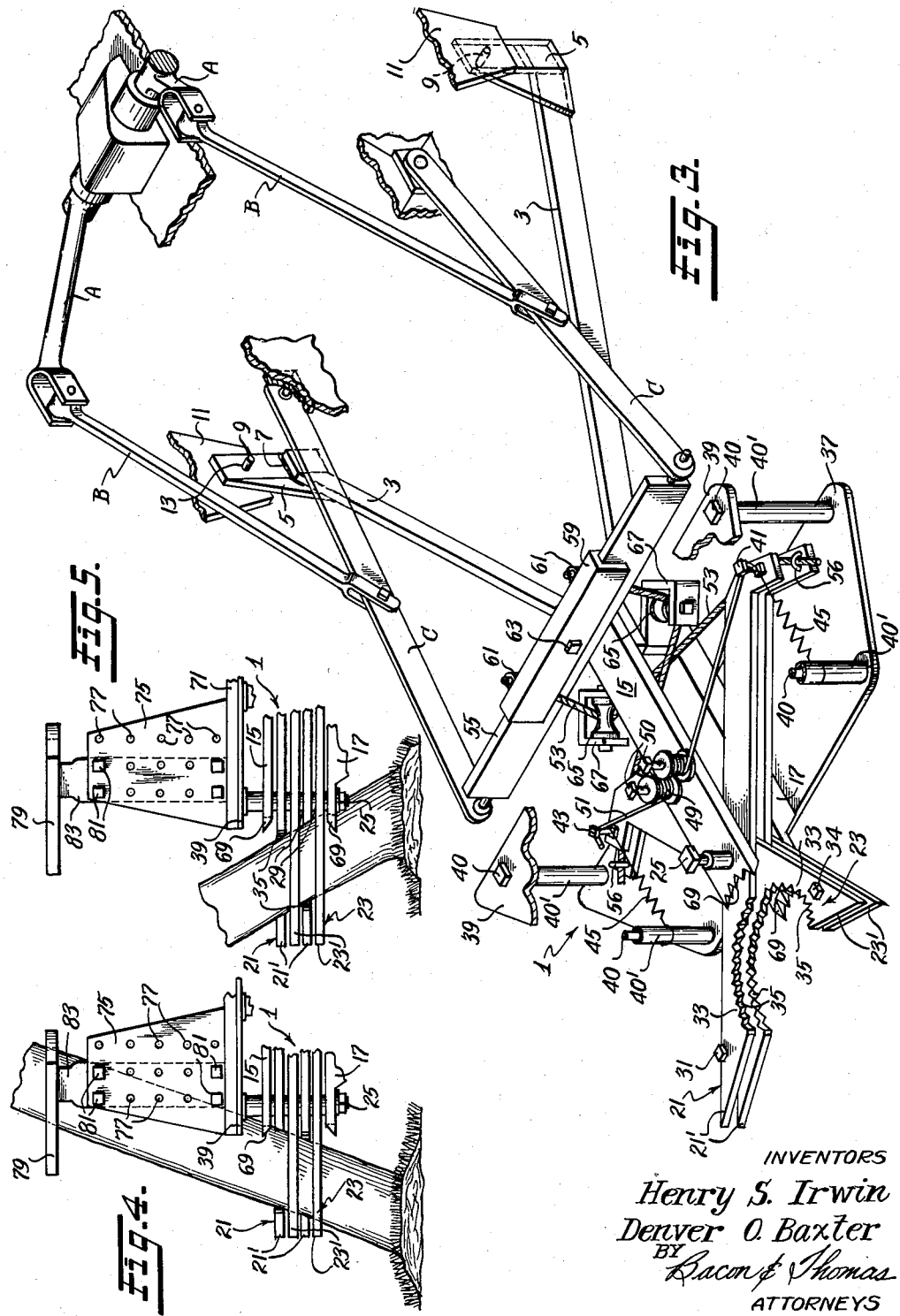
INVENTORS
Henry S. Irwin
Denver O. Baxter
BY
Bacon & Thomas
ATTORNEYS

United States Patent Office 3,116,048
Patented Dec. 31, 1963

3,116,048
UPROOTING ATTACHMENT FOR TRACTORS
Henry S. Irwin, Rte. 2, Greenback, Tenn., and Denver O. Baxter, 1841 Terrace Ave., Knoxville, Tenn.
Filed Nov. 6, 1961, Ser. No. 150,270
5 Claims. (Cl. 254—132)

This invention relates to a device for uprooting, unearthing or otherwise removing shrubs, bushes, trees, posts or the like from the ground.

More specifically, the invention relates to improvements in uprooting devices adapted to be attached to the rear end of a tractor or like vehicle for uprooting trees, shrubs, posts, bushes, etc., and transporting them to the desired destination.

In the past, most of the uprooting devices for trees, etc., have either been an integral part of a vehicle or large cumbersome attachments too large for one man alone to mount or demount on a vehicle. Smaller devices have not been self-energizing nor constructed sufficiently strong and rugged to withstand the force applied thereto by the forward and rearward drive motion of the vehicle as well as the lift force. In additon, prior uprooting devices have not been provided with appropriate gripping and biting teeth to prevent slippage of the device during the uprooting operation.

It is therefore an object of this invention to provide an uprooting device to be attached to the rear of a conventional 3-point hitch tractor, which device will automatically impart an increasingly more powerful grip on the trunk of the tree or post as the resistance to upheaval of the tree or post increases.

It is a further object of this invention to provide an uprooting device for attachment to the rear of a tractor, thereby forming a unit which can be manipulated with a minimum of effort and thought on the part of the operator.

Another object of this invention is to provide a tree or post uprooting device which can be used as a transporting device for the tree or post when the device is mounted on the rear of a tractor.

Another object is to provide an uprooting device equipped with certain safety features to aid in averting accidents harmful to the operator.

Another object is to provide a tree or post uprooting device featuring one-man operation.

Another object is to provide a tree or post uprooting device which can be adapted to fit hitch systems, other than the conventional 3-point hitch, which are provided on the various different types of vehicles.

Another object is to provide a tree or post uprooting device which utilizes power supplied by the tractor to perform the uprooting operation, the transporting operation, and the unloading operation.

Another object is to provide a tree or post uprooting device wherein the clamping jaws are actuated by the hydraulic or other mechanical lift system of the tractor.

Other and further objects of the invention will be apparent from the following description taken in conjunction with the accompanying drawing in which:

FIGURE 1 is a top plan view of the uprooting device attached to the rear of a tractor, FIGURE 2 is a vertical sectional view taken on line 2—2 of FIG. 1, FIGURE 3 is a fragmentary perspective view of the uprooting attachment with linkage employed in a 3-point tractor hitch, FIGURE 4 is a fragmentary side view of the forward end of the uprooting device gripping a tree trunk and illustrating the effect of forward and lift force applied thereto by a tractor, and FIGURE 5 is a view similar to the one illustrated in FIG. 4 showing the effect of reverse and lift force applied to the tree trunk.

The uprooting device illustrated in the drawings includes a rigid main frame which is generally indicated by the numeral 1. The end of the frame nearest the tractor will be referred to hereafter as the rear end thereof. The rear portion of the frame 1, which is adapted to be attached to a tractor, is formed from rigid bar-like members 3, which diverge and extend rearwardly. The last few inches at the outer ends of members 3 are formed so as to be parallel and brackets 5 are rigidly secured thereto as by welds 7. Horizontally disposed, axially aligned pins 9 are rigidly secured to the axle housing 11 of the tractor and are adapted to extend through openings 13 formed in brackets 5 to pivotally support frame 1 for movement in a vertical plane thereon. Members 3 converge from brackets 5 toward the forward end thereof and are rigidly secured between upper and lower frame members 15 and 17 respectively. Members 3 are rigidly secured to the upper surface of frame member 17 in any suitable manner with spacing block 19 interposed between members 3 and the lower surface of frame member 15 prior to rigidly securing members 3, block 19 and frame member 15 together to complete the main frame 1 of the device.

A pair of arms 21 and 23, which intersect intermediate the ends thereof, are mounted for pivotal movement between upper frame member 15 and lower frame member 17. Pivot pin 25, which is mounted on and extends between upper and lower frame members 15—17, passes through aligned openings 27 formed in arms 21—23 at the intersection thereof for pivotally mounting arms 21—23 on frame 1.

As shown in the drawings, arm 21 includes two spaced apart elements 21', while arm 23 includes two spaced apart elements 23'. The elements, which are interdigitated, are preferably spaced a slight distance apart and spaced from frame members 15—17 to permit free pivotal movement thereof and, for this purpose, thin washers or shims 29 may be placed between each of the elements 21' and 23' and between the elements and frame members as the elements are assembled or pin 25. Elements 21' of arm 21 are held together in vertical alignment for movement as a unit by means of bolts 31 passing through the outer ends thereof while bolts 34 hold together elements 23' of arm 23 in a similar manner. It will be apparent that any number of elements may be employed in the construction of the arms 21—23, the thickness of spacing block 19 being calculated to maintain the upper and lower frame members 15—17 substantially parallel.

The outer ends of arms 21—23 extend beyond the forward end of main frame 1 and are formed with opposed, cooperating gripping jaws 33 between which the trunk of a tree to be uprooted may be gripped. The opposed faces of the gripping jaws are preferably provided with V-shaped biting teeth 35.

It has been determined that there is less tendency for the jaws of the device to slip on a tree trunk when the teeth are inclined from the vertical. The best results have been obtained by inclining the teeth on one element of arm 21 at an angle of between 35° to 45° from the vertical in one direction and inclining the teeth on the adjacent element of the same arm 21 at the same angle but in the opposite direction. This arrangement of inclining the teeth on adjacent elements in opposite directions is best illustrated in FIG. 3.

A cover plate 37 is rigidly secured to the lower surface of frame member 17 and an upper cover plate 39, spaced above the upper surface of frame member 15, is secured to cover plate 37 by means of bolts 40. The spacing between cover plates 37 and 39 is maintained by sleeves 40' surrounding bolts 40 and bearing against the opposed surfaces of plates 37—39. Cover plates 37—39 extend from adjacent the forward end of frame members 15—17 rearwardly to a point beyond the inner ends of arms 21—23 and extend laterally on each side of frame members 15—17 to a point beyond the limit of movement of arms 21—23 to protect the device from debris.

A bolt 41, connecting the inner ends of elements 21' together for movement as a unit, extends above the upper surface of arm 21, and a bolt 43 similarly connects the inner ends of elements 23' together for movement as a unit and extends above the upper surface of arm 23.

Jaws 33 are normally maintained in an open position by resilient means urging the inner ends of arms 21—23 to diverge. A pair of tension springs 45 are secured at one end to bolts 41—43 and at the other end to sleeve 40' of bolts 40, thus urging the inner ends of arms 21—23 to diverge and jaws 33 to open. In addition, a pair of coil springs 49, which are mounted on bolts 50 secured to frame member 15, extend above the upper surface thereof and assist in urging jaws 33 to an open position. Coil springs 49, which include lateral extensions 51 at one end thereof, are secured against rotation to frame member 15 adjacent bolts 50, while the ends of extensions 51 engage and react against bolts 41—43 urging arms 21—23 to diverge.

Arms 21—23 are adapted to be pivoted by means of cables or ropes 53 which extend between the inner ends of arms 21—23 and the lift bar 55 of a conventional three point tractor hitch. Cable clamps 56, secured to arms 21—23 in any suitable manner adjacent the inner ends thereof, fasten one end of cables 53 to arms 21—23. The other ends of cables 53 are fastened to one side of elongated U-shaped clevis 59 by means of cable clamps 61 suitably attached thereto. Clevis 59 is detachably secured to lift bar 55 by means of set screw 63 which is threaded into an opening in clevis 59.

In order to transmit the vertical force of the vehicle lift to the inner ends of arms 21—23 in such a manner as to obtain maximum gripping action of jaws 33, it is desirable to apply the force to the inner ends of arms 21—23 in substantially the same plane as the plane in which the arms pivot. As arms 21—23 pivot in a horizontal plane, and the vehicle lift moves in a vertical direction, cables 53 are guided over pulleys 65 which are mounted in substantially the same plane as the one in which arms 21—23 pivot. U-shaped brackets 67, rigidly mounted on lower frame member 17, rotatably mount pulleys 65 between the side walls thereof. By means of this construction, force applied to cables 53 in a vertical direction through clevis 59 is transmitted through cables 53 to the inner ends of arms 21—23 in a horizontal direction. As illustrated in the drawings, brackets 67 are mounted in such a manner that the cables 53 passing over pulleys 65 are crossed. It is evident that brackets 67 could also be mounted in such a manner that cables 53 could pass over pulleys 65 without crossing. If desirable, other flexible, non-extensible strand material, such as rope or chain, may be employed instead of cables 53.

The forward ends of upper and lower frame members 15—17, which terminate immediate above and below the inner portion of gripping jaws 33, are preferably provided with biting teeth 69. These teeth are relieved or tapered inwardly of frame 1 toward arms 21—23 from the upper and lower surfaces of frame members 15 and 17 respectively.

The base 71 of a U-shaped support may be secured to the upper surface of cover plate 39 by means of bolts 73. The arms 75, extending upwardly from base 71, are each provided with a series of openings 77. A cradle 79, which aids in supporting a tree being transported and protects the operator of the vehicle, is adjustably attached to arms 75 by bolts 81 passing through openings 77 and through legs 83 which are rigidly attached to and depend from cradle 79.

It is often desirable to raise and lower the device without employing the vehicle lift, and for this purpose a bracket 85 may be attached to the upper surface of frame member 15 by bolt 87. One end of a rope 89 is attached to bracket 85 and the other end to a winch 91 rigidly mounted on the upper part of the tractor housing. A crank 93 may be employed to rotate the winch 91 to raise or lower frame 1 to the desired height.

The tractor lift shown in the drawings is of the conventional 3-point type and includes, lift arms A operably connected at the inner ends thereof to the power source, links B pivotally attached at one end to the outer ends of arms A, and lift arms C pivotally mounted at 2 at one end on the tractor and pivotally connected together at the other end thereof by bar 55, links B being pivotally connected at the other ends thereof to arms C intermediate the ends of arms C. It will be seen that raising arms A will cause arms C to pivot about the ends thereof attached to the tractor and thus raise lift bar 55 in a vertical direction. It is intended that the device disclosed herein may be pivotally attached to vehicles other than tractors which are provided with any type of actuator by means of which clevis 59 and cables 53 may be lifted or pulled.

In operation, the uprooting device is mounted on a tractor and fastened thereto by pins 9. Clevis 59 is placed on the lift bar 55 of the tractor, set screw 63 tightened and the tractor is backed up to a tree or post or the like which is to be uprooted or unearthed. When the jaws 33 are in abutment with the trunk of the tree or post, the lift bar 55 is elevated as by a conventional tractor hydraulic or mechanical lift system. The lift system pulls cables 53 upward and imparts a small vertical component of force to the frame 1 through pulleys 65 tending to lift the entire device about pins 2. However, until the jaws are closed on the trunk, this force remains less than the component of weight of the device acting downwardly, and hence the device does not lift until the jaws are closed. Reluctance of the tree or post to yield its hold in the ground resisting the lifting of the device results in further tightening of the jaws, thereby improving the grip by sinking the teeth of the jaws further into the woody portion of the trunk of the tree or post. Thus, the harder the lifting force that is applied, the harder the jaws bite the tree trunk or post; and the greater the resistance to uprooting, the more forceful is the grip or biting action of the jaws. This feature affords a grip on the trunk which will automatically meet the gripping demand imposed by the various degrees of resistance against removal from the ground offered by different trees and posts.

Small trees, posts, bushes, etc. can be easily uprooted by the vertical force applied thereto while larger trees or posts can be first loosened in the ground by rocking the trunk back and forth while a lifting force is being applied to the trunk, by alternately driving the tractor forward and then in reverse. As illustrated in FIG. 4, the trunk of a tree is gripped in the jaws of the uprooting device and the tractor is in forward drive while applying a lifting force to the trunk. The teeth 35 on jaws 33 as well as the teeth 69 on upper frame member 15 bite into the trunk, which is inclined forwardly by the pull of the tractor, and prevent the uprooting device from slipping upward thereon. In FIG. 5, the tractor is in reverse drive and a lifting force is applied to the tree trunk. The trunk is inclined in a rearward direction by the reverse push of the tractor and the teeth 69 on lower frame member 17 together with teeth 35 on jaws 33 bite into the trunk and prevent slipping of the device upwardly thereon.

When the tree or post is uprooted and raised out of the ground, the lift bar 25 can be raised further, and the unearthed tree or post can be transported, while being held in the jaws, to any desired destination. Removal of the unearthed tree or post from the uprooting device is accomplished by lowering the lift bar 55 thereby releasing the tension in cables 53 and permitting the jaws to open under the force of their normal spring bias.

Cradle 79 aids in supporting the tree and prevents the tree from falling upon the operator during the unearthing and transporting operation.

While a preferred embodiment of the invention is disclosed herein, other modifications, alterations and equivalents which may occur to those skilled are to be considered as falling within the scope of this invention as defined by the appended claims.

We claim:
1. An uprooting attachment for vehicles comprising:
   (a) a rigid frame;
   (b) means for pivotally mounting said frame on a vehicle for movement in a vertical plane;
   (c) a pair of arms intersecting intermediate the ends thereof mounted on said frame for pivotal movement about an axis passing through said intersection,
   (d) the inner ends of said arms diverging and pivoting in a plane normal to said axis;
   (e) cooperating gripping jaws formed on said arms adjacent the outer ends thereof;
   (f) a flexible, non-extensible strand attached at one end thereof to the inner end of each of said arms and adapted to be attached at the other end thereof to a lift device on the vehicle; and
   (g) guide means for said strands mounted on said frame between said inner ends of said arms and the point of attachment of said strands to the vehicle lift device,
   (h) said strands extending over said guide means and being disposed substantially horizontal from said connection to said arms to said guide means and being disposed substantially vertical from said guide means to the vehicle lift device, whereby actuation of the vehicle lift device in a direction to tension said strands results in pivoting said arms to urge said jaws toward closed cooperative engagement for gripping the object to be uprooted, continued actuation of said vehicle lift device in said direction resulting in pivoting said frame upwardly about said mounting on the vehicle for uprooting the object being gripped between said jaws.

2. An uprooting attachment for vehicles as defined in claim 1, including:
   (a) resilient means mounted on said frame operably connected to said inner ends of said arms urging said outer ends of said arms into open position.

3. An uprooting attachment for vehicles comprising:
   (a) a rigid frame including spaced apart upper and lower members at the front end thereof;
   (b) means adjacent the rear end of said frame for pivotally mounting said frame for movement in a vertical plane on a vehicle;
   (c) a pair of arms intersecting intermediate the ends thereof disposed with said intersection between said spaced apart members;
   (d) means mounting said arms at said intersection thereof for pivotal movement;
   (e) the outer ends of said arms extending outwardly beyond the forward edge of said frame and being provided with cooperating gripping jaws;
   (f) the forward edges of said spaced apart members terminating adjacent said jaws and being provided with teeth; and
   (g) means attached adjacent the inner ends of said arms, and adapted to be connected to a lift device on a vehicle, for pivoting said arms to urge said jaws toward closed cooperative engagement.

4. An uprooting attachment for vehicles as defined in claim 3, including:
   (a) upper and lower cover plates, each extending laterally of said frame to a point beyond the outermost limit of movement of said pivoted arms and from adjacent said forward edges of said spaced apart members to a point beyond the inner ends of said arms;
   (b) said lower plate being rigidly secured to the lower surface of said lower frame member;
   (c) said upper plate being spaced above said upper member and rigidly secured to said lower plate; and
   (d) a cradle adjustably secured to the upper surface of said upper cover plate.

5. An uprooting attachment for vehicles as defined in claim 1 wherein:
   (a) each of said arms consists of at least two parellel elements spaced apart a distance slightly greater than the thickness of said elements;
   (b) said elements comprising one arm being interdigitated with said elements comprising the other arm; and
   (c) teeth formed on the opposed surfaces of said cooperating gripping jaws;
   (d) said teeth on one element of each of said arms being substantially V-shaped and inclined in one direction from the vertical;
   (e) said teeth on the adjacent element of each of said arms being substantially V-shaped and inclined in the other direction from the vertical.

References Cited in the file of this patent

UNITED STATES PATENTS

| | | |
|---|---|---|
| 1,764,905 | Standfuss | June 17, 1930 |
| 2,482,950 | Tofty | Sept. 27, 1949 |
| 2,505,923 | Taylor et al. | May 2, 1950 |
| 2,511,657 | Welch | June 13, 1950 |
| 2,597,740 | Lyle | May 20, 1952 |
| 2,683,019 | Saunders et al. | July 6, 1954 |
| 2,740,210 | Hamborg | Apr. 3, 1956 |

FOREIGN PATENTS

| | | |
|---|---|---|
| 374,617 | Germany | Feb. 25, 1921 |
| 824,068 | Great Britain | Nov. 25, 1959 |